United States Patent [19]

Ishihara

[11] Patent Number: 4,868,411

[45] Date of Patent: Sep. 19, 1989

[54] SIGNAL CONVERSION CIRCUIT

[75] Inventor: Tsutomu Ishihara, Tokyo, Japan

[73] Assignee: NEC Corporation, Japan

[21] Appl. No.: 165,441

[22] Filed: Feb. 29, 1988

Related U.S. Application Data

[63] Continuation of Ser. No. 75,236, Jul. 17, 1987, abandoned, which is a continuation of Ser. No. 935,620, Dec. 3, 1986, abandoned, which is a continuation of Ser. No. 656,156, Sep. 28, 1984, abandoned.

[30] Foreign Application Priority Data

Sep. 29, 1983 [JP] Japan ................................. 58-181101

[51] Int. Cl.[4] ........................................... H01H 35/00
[52] U.S. Cl. .................................... 307/119; 307/116;
340/665; 340/668; 341/122; 341/172; 73/770;
73/862.53
[58] Field of Search ............... 307/116, 117, 118, 119,
307/120, 125, 126, 353; 340/524, 626, 665, 668,
347 NT, 347 SH; 73/770, 862.53; 324/98, 990;
341/122–126, 138, 139, 155, 158, 164, 165, 172

[56] References Cited

U.S. PATENT DOCUMENTS 3,421,093  1/1969  Hinrichs et al. .............. 340/347 SH
3,573,816  4/1971  Helgeland ...................... 307/125 X
3,744,047  7/1973  Allen ................................ 307/116
4,217,543  8/1980  Strong ...................... 340/347 NT X
4,404,545  9/1983  Nakanishi et al. ............... 324/99 D
4,578,646  3/1986  Maio et al. ..................... 307/353 X

OTHER PUBLICATIONS

*Zeroing Loop Reduces Instrumentation Amplifier Offsets* by Cerat, EDN Magazine, Mar. 20, 1976, pp. 100 and 102.
*Instrumentation Amplifiers* by R. Duris, EDN Magazine, Sep. 5, 1977, pp. 133–135.

Primary Examiner—Derek S. Jennings
Attorney, Agent, or Firm—Laff, Whitesel, Conte & Saret

[57] ABSTRACT

A signal conversion circuit converts variations in resistance into an electrical signal. The conversion circuit comprises both a bridge circuit and a single operational amplifier with a capacitor between them to store voltage samples produced by an unbalancing of the bridge. The bridge circuit has a detector element such as a strain gauge for providing a resistance variation. A capacitor is connected through switches to both the bridge circuit and signal operational amplifier. The switches operate in a sequence whereby the operational amplifier is disconnected from the capacitor during the storage of the sample and the bridge is disconnected from the capacitor during intervals while the charged capacitor is connected to the amplifer.

3 Claims, 1 Drawing Sheet

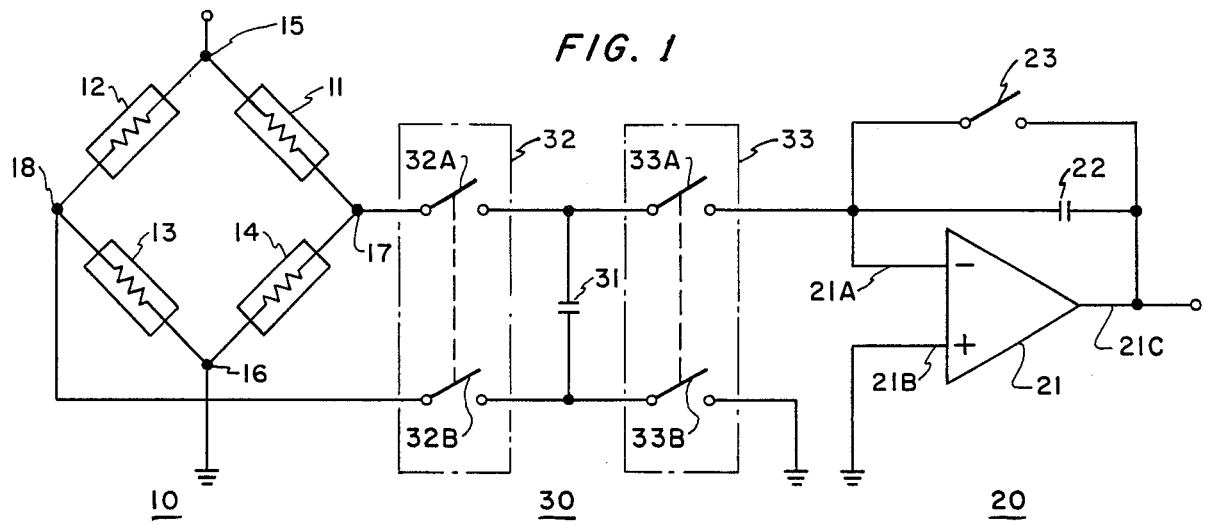
FIG. 1
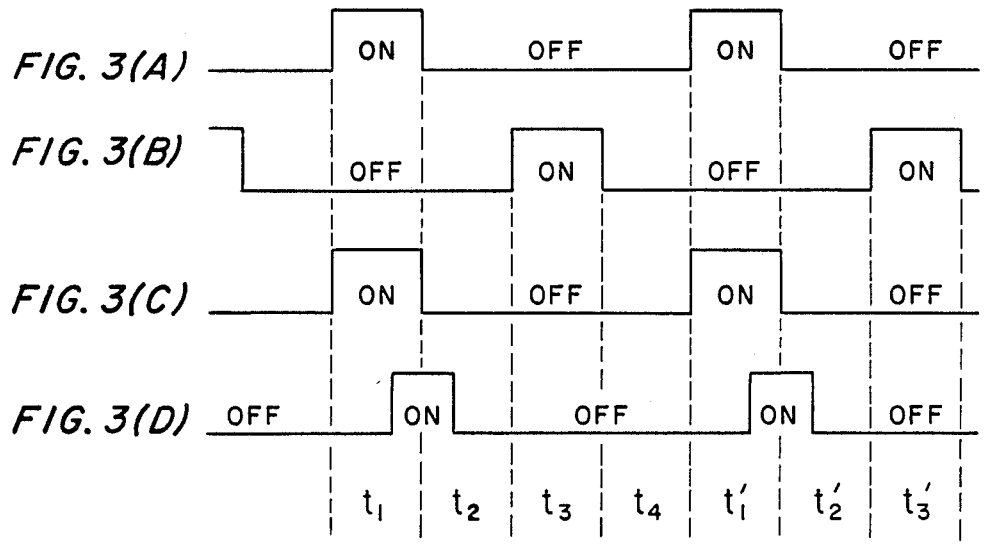
FIG. 3(A)
FIG. 3(B)
FIG. 3(C)
FIG. 3(D)
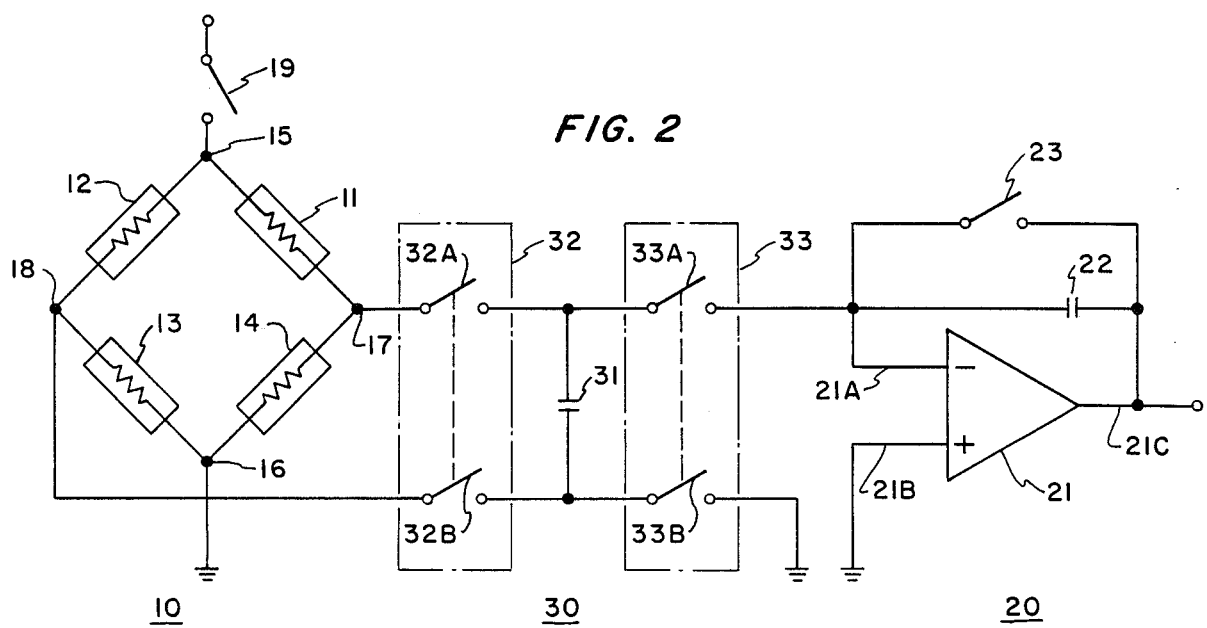
FIG. 2

SIGNAL CONVERSION CIRCUIT

This application is a continuation of application Ser. No. 075,236 filed July 17, 1987, now abandoned which was a continuation of Ser. No. 935,620 filed Dec. 3, 1986 now abandoned which was a continuation of Ser. No. 656,156 filed Sep. 28, 1984 now abandoned.

This invention relates to a signal conversion circuit and, more particularly, to a resistance-voltage circuit for converting a variation of resistance, detected by a physical value detector element, into an electrical voltage signal.

Heretofore, a pressure converter using a strain gauge has been well known and used as a resistance-voltage conversion circuit. For example, such a pressure converter is disclosed in an article entitled "CHARACTERISTICS AND APPLICATION OF A SEMICONDUCTOR PRESSURE SENSOR", published in the Japanese technical magazine "SENSOR TECHNIQUE", Vol. 2, No. 8 (July, 1982), pp. 97–103. Here, a Wheatstone bridge circuit is constructed of gauge resistors. Variation of resistance of the gauge resistors occurs in response to an applied pressure. An unbalanced voltage is obtained by supplying a constant voltage or current to the bridge circuiit. That voltage is amplified by a differential amplifier circuit including a number of operational amplifiers and resistors that provide an output signal which is proportional to the applied pressure.

Such a conventional pressure converter, however, has the following disadvantages:

(1) A high quality differential amplifier circuit including a number of operational amplifiers is necessary for amplifying a minute unbalance voltage from the bridge circuit, thereby making the converter complicated and expensive; and (2) Problems occur because a number of resistors must be connected to operational amplifiers; therefore, there are problems in quality and matching resistors, which makes it impossible to make a monolithic integrated circuit.

To solve the above-mentioned problem (1), a simplified pressure converter comprising a simplified differential amplifier circuit of a single-operational-amplifier type is connected to the Wheatstone bridge circuit. The simplified differential amplifier is composed of only one operational amplifier and a resistor circuit including four resistors. However, such a simplified pressure converter also has the following disadvantages:

(1) It is impossible to heighten an input resistance because the load for the bridge circuit is high; and (2) An unbalance in resistance-ratio is inevitable in the resistor circuit, thus causing a deterioration of a gain characteristic and a common-mode rejection ration (cmrr).

It is, therefore, an object of this invention to provide a signal conversion circuit for resistance-voltage converting that does not require a number of operational amplifiers.

It is another object of this invention to provide a signal conversion circuit which is adapted to be made in an integrated circuit.

It is still another object of this invention to provide a signal conversion circuit in which a common-mode rejection ratio is not deteriorated.

According to this invention, a signal conversion circuit converts a resistance into an electric signal. The circuit comprises a bridge circuit including a detector element for providing a resistance variation and a single operational amplifier having inverted and non-inverted input terminals and an output terminal. A first capacitor is isolated between first switching means connected to the bridge circuit, and second switching means connected to the single operational amplifier.

The features and advantages of this invention will be better understood from the following detailed description of preferred embodiments of this invention taken in conjunction with the accompanying drawings, wherein:

FIG. 1 is a circuit diagram of a first embodiment of this invention;

FIG. 2 is a circuit diagram of a second embodiment of this invention; and

FIGS. 3(A) to 3(D) are timing charts illustrating operations of the first and second embodiments shown in FIGS. 1 and 2.

Referring to FIG. 1, a first embodiment of this invention comprises a Wheatstone bridge circuit 10, a single-operationalamplifier type differential amplifier 20 and a capacitor circuit 30 isolated by two switches between the bridge circuit 10 and the differential amplifier 20. The Wheatstone bridge circuit 10 has four gauge resistors 11 to 14, exciting terminals 15 and 16 between which a constant voltage or current is applied, and detection terminals 17 and 18 from which a detection signal is obtained as an unbalanced voltage. In the bridge circuit, the resistances of the gauge resistors 11 to 14 are varied in response to an applied pressure. The resistance variations are detected as the unbalanced voltage $\Delta E$ by applying the constant voltage or current between the exciting terminals 15 and 16.

The capacitor circuit 30 is composed of a first capacitor 31 having a capacitance $C_1$. Capacitor 31 is isolated between first switching means 32 including switchers 32A and 32B respectively connected to both ends of the first capacitor 31, and second switching means 33 including switches 33A and 33B also respectively connected to the both ends of first capacitor 31. The other terminals of the switchers 32A and 32B are connected to the detection terminals 17 and 18 of the bridge circuit 10, respectively. The other terminals of the switcher 33B are connected to a difference amplifier 20 and to biasing terminal (ground in this embodiment). A timed controller 40 operates the switching means 32, 33, 23 according to the timed sequence shown in FIGS. 3A–3D.

The single-operational-amplifier type differential amplifier 20 is composed of only one operational amplifier 21 having inverted and non-inverted input terminals 21A and 21B and an output terminal 21C. A second capacitor 22 is connected between the inverted input terminal 21A and the output terminal 21C. A third switching means 23 is connected in parallel to the capacitor 22. The inverted input terminal 21A is also connected to the other terminal of the switcher 33A. The non-inverted input terminal 21B is connected to the biasing means (ground in this embodiment).

An operation of the first embodiment shown in FIG. 1 will be described with reference to FIGS. 3(A), 3(B) and 3(C) which are timing charts showing operating timings of the first, second and third switching means 32, 33 and 23, respectively. The symbols "ON" and "OFF" represent that the switcher is closed and opened, respectively.

At a first time period $t_1$, the switchers 32A and 32B are closed in the first switching means 32, whereby the capacitor 31 is charged by the unbalanced voltage $\Delta E$ obtained by the bridge circuit 10. Further, the third switching means 23 is also closed to place the operational amplifier 21 in a unity feedback connection. Both the inverted input terminal 21A and the output terminal 21C are biased to a potential of the non-inverted input terminal 21B, that is, to the ground potential in this embodiment. In this time period, an electric charge of the second capacitor 22 is reset to zero.

At a second time period $t_2$, the first switching means 32 is opened to cut off the bridge circuit 10. The electric charge $C_1 \Delta E$ is proportional to the unbalanced voltage $\Delta E$ obtained by the bridge circuit 10 and is on the capacitor 31. Although the third switching means 23 is also opened, the output terminal 21C is maintained at the ground potential because the second capacitor 22 has no electric charge.

During a third time period $t_3$, the switchers 33A and 33B in the second switching means 33 are closed to connect the first capacitor 31 between the inverted input terminal 21A and the ground. The operational amplifier 21 operates in such a manner that a voltage difference between the inverted and non-inverted input terminals 21A and 21B is amplified and the second capacitor 22 is charged by an output voltage during a transient period. Finally, the voltage difference between the inverted and non-inverted input terminals 21A and 21B becomes zero. Therefore, the potential of the inverted input terminal 21A becomes zero volts and the electric charge $C_1 \Delta E$, which has been accumulated in the first capacitor 31, is completely transferred to the second capacitor 22. This means, in accordance with the law of conservation of electric charge, that $C_1 \cdot \Delta E + C_2 V_0 = 0$ (where $V_0$ stands for an output voltage). Therefore, the output voltage $V_0$ is represented by the following equation:

$$V_0 = -(C_1/C_2) \cdot \Delta E$$

During a fourth time period $t_4$, the second switching means 33 is opened, whereby the first capacitor 31 is disconnected from the operational amplifier circuit 21. Therefore, the electric charge accumulated in the second capacitor 22 is maintained as it is, thereby holding the output voltage $V_0$ at $-(C_1/C_2) \cdot \Delta E$.

Later, during sequential time periods $t_1'$, $t_2'$, $t_3'$,—, the above-mentioned operations are periodically repeated at intervals equal to the time periods $t_1$ to $t_4$.

Thus, the electric charge proportional to the unbalanced voltage $\Delta E$ is accumulated on the first capacitor 31. Then, the accumulated electric charge is transferred to the second capacitor 22 which has been previously reset, thereby obtaining a gain depending upon a capacitance ration $(C_1/C_2)$ for the first and second capacitors 31 and 22.

If the charge-leakage from the first capacitor 31 is negligible, the input resistance for the differential amplifier circuit 20 is infinite. Thus, it is possible to make the load for the bridge circuit 10 extremely small. A differential amplifier having a very high degree of common-mode rejection ratio (CMRR) can be obtained, because the CMRR is, in principle, infinite in a process for accumulating an electrical charge which is proportional to the unbalanced voltage from the bridge circuit 10 in the first capacitor 31.

Referring to FIG. 2, a second embodiment of this invention is identical to the first embodiment shown in FIG. 1 except that a fourth switching means 19 is added for switching the application of the constant voltage or current through the exciting terminals 15 and 16 to the bridge circuit 10. In the second embodiment, the constant voltage or current is applied intermittently while it is continuously applied in the first embodiment. If the first, second and third switching means 32, 33 and 23 operate in accordance with the timings shown in FIGS. 3(A), 3(B) and 3(C), respectively, the switching timing for the fourth switching means 19 is defined so that an opening time point for switching from a closed-state to an opened-state is positioned after the first switching means 32 has been opened. A closing time point for the fourth switching means 19 can be positioned both before and during the closed-state for the first switching means 32. In other words, the switching timing for the fourth switching means 19 is defined so that the opening time point for the first switching means 32 is positioned in the closed-state for the fourth switching means 19. One example of the switching timing for the fourth switching means 19 is shown in FIG. 3(D).

As clearly understood from FIGS. 3(A) through 3(D), although the unbalanced voltage $\Delta E$ is obtained only during the closed-state of the fourth switching means 19, the electric charge proportional to the unbalanced voltage $\Delta E$ can be accumulated in the first capacitor 31. This accumulation occurs because the opening time point for the first switching means 32 is co-incidental with the opened-state of the fourth switching means 19. Therefore, the second embodiment operates in a similar manner to that of the first embodiment, thus providing the output voltage $V_0 = -(C_1/C_2) \cdot \Delta E$.

In the second embodiment, the period for applying the constant voltage or current to the bridge circuit is short, thus the driving electric power can be reduced extremely.

The switching timings for the first, second and third switching means 32, 33 and 23 can be voluntarily defined if the following conditions are satisfied:

(1) The first and second switching means are not closed simultaneously; and (2) Only while the third switching means 23 is opened, the second switching means 33 is changed from the opened-state to the closed-state.

Further, the fourth time period $t_4$ is not always necessary. The ratio between the time periods $t_1$, $t_2$ and $t_3$ can be freely defined.

According to this invention the signal conversion circuit may be made in an integrated circuit. For example, the switching means may be MOSFET's, and the capacitors may be the capacitances between MOS gate electrodes and inverted layers or the capacitances between dual-layer electrodes. Further, the gauge resistors may be diffusion resistors formed on a semiconductor diaphragm by means of a selective diffusion technique.

Those who are skilled in the art will readily perceive how to modify the invention. Therefore, the appended claims are to be construed to cover all equivalent structures which fall within the true scope and spirit of the invention.

What is claimed is:

1. A signal conversion circuit for converting a resistance variation into an electric signal, the circuit comprising:
   bridge means including four resistors connected in a closed loop, one of said four resistors being a detection element which changes its resistance in accordance with a physical condition applied thereto, and said bridge means having a first connection point between first and second of said four resistors, a second connection point between second and third of said four resistors, a third connection point between third and fourth of said four resistors, and a fourth connection point connecting between fourth and third of said four resistors;

a power supply means for applying a voltage between said first and third connection points;

single operational amplifier means having inverted and noninverted input terminals and an output terminal;

a first capacitor having a first capacitance;

first switching means coupled between said bridge means and said first capacitor for charging said first capacitor with electric charges in response to a voltage difference between said second and fourth connection points;

second switching means coupled between said first capacitor and said inverted and said non-inverted input terminals;

a second capacitor connected between said inverted input terminal and said output terminal and having a second capacitance; and third switching means connected in parallel with said second capacitor;

said second switching being closed after said first and said third switching means are opened, said switching means transferring said electric charges to said second capacitor to make said single operational amplifier means produce said electric signal at said output terminal with a voltage which is substantially equal to a voltage difference between said second and fourth connection points multiplied by a ratio of said first capacitance to said second capacitance;

2. A signal conversion circuit for converting a resistance variation into an electric signal, said circuit comprising;

a bridge circuit comprising first through fourth resistors each having two ends, said second resistor having one end connected through a first connecting point to one end of said first resistor, said third resistor having one end connected through a second connecting point to the other end of said second resistor, and said fourth resistor having one end connected through a third connecting point to said other end of said third resistor and having the other end connected through a fourth connecting point to the other end of said first resistor, one of said first to fourth resistors presenting a resistance which changes in response to a pressure applied thereto;

a power supply means for applying a voltage between said first and third connecting points;

a first capacitor having a first capacitance;

a single operational amplifier having inverted and noninverted input terminals and an output terminal;

a second capacitor connected between said inverted input terminal and said output terminal and having a second capacitance;

a first pair of simultaneously operable switches for supplying a voltage difference between said second and fourth connecting points across said first capacitor to said first capacitor with electric charges, one of said first pair of switches being inserted between one end of said first capacitor and said second connecting point, and the other of said first pair of switches being inserted between the other end of said first capacitor and said fourth connecting point;

a single switch for shunting said second capacitor; and a second pair of simultaneously operable switches closed after said first pair of simultaneously operable switches and said single switch are opened, said second pair of simultaneously operable switches connecting said one said other ends of said first capacitor between said inverted and said noninverted input terminals, respectively, to transfer said electric charges to said second capacitor and to make said single operational amplifier produce said electric signal at said output terminal with a voltage which is substantially equal to said voltage difference multiplied by a ratio of said first capacitance to said second capacitance.

3. A signal conversion as claimed in claim 2, further comprising means for controlling said power supply means to energize said bridge circuit before said first pair of simultaneously operable switch is opened.

* * * * *